United States Patent [19]

Nishihara et al.

[11] Patent Number: 5,518,810
[45] Date of Patent: May 21, 1996

[54] INFRARED RAY CUTOFF MATERIAL AND INFRARED CUTOFF POWDER USE FOR SAME

[75] Inventors: Akira Nishihara; Toshiharu Hayashi; Masahiro Sekiguchi, all of Omiya, Japan

[73] Assignee: Mitsubishi Materials Corporation, Tokyo, Japan

[21] Appl. No.: 268,912

[22] Filed: Jun. 30, 1994

[30] Foreign Application Priority Data

Jun. 30, 1993 [JP] Japan .................. 5-162198
Jun. 30, 1993 [JP] Japan .................. 5-162199
Jun. 30, 1993 [JP] Japan .................. 5-162200
Oct. 18, 1993 [JP] Japan .................. 5-260248
Oct. 18, 1993 [JP] Japan .................. 5-260249
Oct. 18, 1993 [JP] Japan .................. 5-260250

[51] Int. Cl.$^6$ .................. B32B 5/16; C09D 5/33
[52] U.S. Cl. .................. 428/328; 252/518; 252/587; 427/162; 427/165; 427/168; 427/163.1; 428/329; 428/331; 428/426; 428/518; 428/689; 428/702
[58] Field of Search .................. 427/162, 163, 427/165, 168; 428/323, 328, 329, 426, 689, 702, 331; 252/518, 587

[56] References Cited

U.S. PATENT DOCUMENTS

4,937,148  6/1990  Sato et al. .................. 423/618

Primary Examiner—D. S. Nakarani
Attorney, Agent, or Firm—Ronald J. Kubovcik

[57] ABSTRACT

An infrared-ray cutoff material having a structure in which tin-doped indium oxide powder (ITO) powder is dispersed in an inorganic or organic matrix. The material can be in the form of a coating on a substrate available by applying a composition comprising ITO powder, a binder (an organic resin and/or a metal alkoxide) and a solvent (an organic solvent, water and/or alcohol) onto the substrate and drying the same. It may also be in the form of a film, a sheet, a fiber or other shape available by forming a composition made by dispersing ITO powder in an organic polymer. The ITO powder should preferably have an x-value of from 0.220 to 0.295 and a y-value of from 0.235 to 0.352 on the xy chromaticity scale, a lattice constant of from 10.110 to 10.160 Å, and a minimum cutoff wavelength of up to 1,000 nm. The infrared-ray cutoff material of the present invention is transparent within the visible region and can totally cut off infrared rays of wavelengths ranging from relatively shorter ones.

20 Claims, 3 Drawing Sheets

INFRARED RAY CUTOFF MATERIAL AND INFRARED CUTOFF POWDER USE FOR SAME

BACKGROUND OF THE INVENTION

The present invention relates to an infrared cutoff powder comprising tin-doped indium oxide powder having an infrared cutoff function, an infrared cutoff material in the form of a coating, a film or other shape containing such powder, and a method of manufacturing the same.

This infrared-cutoff powder can cut off infrared rays by more than 90% on the longer-wave side from a wavelength shorter than in the conventional practice, or more specifically, from a wavelength of under 1,000 nm, particularly from a wavelength within a range of from 700 to 900 nm, and is permeable to visible light. It is therefore possible to form from the powder a transparent coating selectively cutting off infrared rays. It can be used, for example, by mixing with cosmetics.

This transparent coating having an infrared ray cutoff effect is useful as a means for preventing forgery of cash cards or other money-substituting papers frequently occurring at present, or as an infrared-ray cutoff coating exerting remarkable effects on the improvement of air-conditioning efficiency. Particularly when used for an ordinary window of housing, a sun-roof, a wall material, or glass for an automobile, this transparent coating displays a remarkable saving of electric power for cooling rooms through cutoff of infrared rays of sunlight in summer, and is applicable as a transparent coating having a high heat-insulating effect in winter. It exerts also a heat-insulating effect on vinyl house farms and hothouses. Furthermore, it is applicable to various products including optical fibers, prepaid cards, sun visors, PET (polyethylene terephthalate) bottles, packaging films, glasses, textile products, peep holes of heating equipment and room-heating appliances and can impart infrared-ray cutoff effects to these products.

As a transparent coating having an infrared-ray cutoff function, which is permeable to a light within the visible region and reflective to light within the infrared region, there are conventionally known: (a) a coating formed on a glass substrate by depositing a thin film of tin-doped indium oxide (hereinafter abbreviated as "ITO") by a vapor deposition method such as physical evaporation, chemical evaporation, or sputtering; (b) an organic coloring matter type near-infrared absorber such as provided by a phthatocyanine group, anthraquinone group, naphthoquinone group, cyanin group, naphthalocyanin group, macromolecular condensation azo group or pyrrole-group, or an organic metal complex of a dithiol group, mercaptonaphthol group or the like, converted into an ink with the use of an organic solvent and an organic binder, which is applied to a substrate, or kneaded with a resin to form a coating, which is laminated on a substrate.

However, said means (a), in which an apparatus requiring a high vacuum or high-accuracy atmosphere control must be used, leads to a high cost and restrictions in size and shape of the coating. Furthermore, it involves such problems as a low capability of mass production and a poor general applicability.

For said means (b), in which the problems of (a) are solved, light transmissivity within the visible region is low, and the coating has a dark color tone such as dark brown or dark blue. In addition, infrared-ray absorption is limited within the near-infrared region of about 690 to 1,000 nm in most cases. When applied to an ordinary window of housing, a roof material for a sun roof, or a wall material, therefore, visibility through a window or glass is low in and outside of the room, with a poor color tone and an insufficient air-conditioning effect in the room.

In view of these problems, (c) a method of forming an infrared-ray absorbing coating has recently been proposed (Japanese Patent Provisional Publication No. 63-281,837), which comprises the steps of preparing a coating material from an organic binder (polyvinyl chloride, an acrylic resin, etc.) and $SnO_2$ fine particles having infrared-ray cutoff ability and a particle size of from 0.02 to 0.2 µm, an organic solvent (ketone, aromatic group or the like) and a slight amount of dispersant (anionic surfactant) and applying the thus prepared coating material onto a substrate. In order to cause this coating to fully display its infrared-ray cutoff ability, it is necessary to select a coating thickness of at least 12 µm and apply a hot press treatment. A coating thickness of this order results in a low optical transmissivity to visible light of about 50 to 60%, thus impairing transparency.

There is, therefore, an increasing demand for development of a transparent coating having infrared-ray cutoff ability meeting the requirements of the market.

SUMMARY OF THE INVENTION

An object of the present invention is to provide an infrared-ray cutoff material which is substantially colorless and transparent and permits mass production of a large-area infrared-ray cutoff coating or other coatings at a low cost.

Another object of the present invention is to provide a method of manufacturing an infrared-ray cutoff coating or shape by a coating application or a known forming technology by the use of a powder excellent in infrared-ray cutoff effect.

A further object of the present invention is to permit manufacture of an infrared-ray cutoff material, without using an organic solvent, by using water and/or an alcoholic solvent, without affecting the environment.

A further object of the present invention is to provide an inorganic powder, having a infrared-ray cutoff function, which is useful in forming the above-mentioned infrared-ray cutoff off material, permits cutting of infrared rays from a lower wavelength than in the conventional method, and enables a coating to be formed having excellent transparency to visible light.

In accordance with the present invention, there is provided an infrared-ray cutoff material in which ITO (tin-tin-doped indium oxide) powder, which is an inorganic compound semiconductor, is dispersed in an organic or inorganic matrix. This infrared-ray cutoff material may take the form of a coating on a substrate or an independent shape.

According to the present invention, there is provided a method of manufacturing an infrared-ray cutoff material in the form of a coating, which comprises the steps of applying a composition comprising one or more kinds of binder, ITO powder and a solvent onto a substrate, and drying the resultant coating. Apart from an organic resin, an alkoxide of silicon, aluminum, zirconium or titanium or a partially hydrolyzed product thereof may be used as a binder. One or more solvents may be selected from the group consisting of organic solvents, alcohol and water.

In addition, there is provided a method of manufacturing an infrared-ray cutoff material in the form of a shape, which comprises the step of forming a composition comprising an organic polymer and ITO powder dispersed therein into a desired shape.

In a preferred embodiment, ITO powder can totally cut off more than 90% of infrared rays on the longer wavelength side from a wavelength of under 1,000 nm.

According to the present invention, furthermore, an ITO powder having an infrared-ray cutoff function, which has a color tone as represented, on the xy chromaticity scale, by an x-value of from 0.220 to 0.295 and a y-value of from 0.235 to 0.325, a lattice constant within a range of from 10.110 to 10.160 Å, and a minimum cutoff wavelength within and near the infrared region of up to 1,000 nm is provided.

DETAILED DESCRIPTION OF THE INVENTION

[ITO powder]

ITO powder was developed as a transparent conductive powder and has been applied for forming a transparent conductive film by preparing a coating material from this powder in combination with an appropriate binder. However, utilization of ITO powder for its infrared-ray cutoff function has never been attempted.

As a result of an investigation carried out by the present inventors, it was found that ITO powder has a high light reflectivity within the near-infrared ray region and a coating formed from a coating material prepared from ITO powder is useful as an infrared-ray cutoff coating. By kneading ITO powder into a molten or softened resin and forming the resultant mixture into a film, a sheet or other shape, a similar infrared-ray cutoff effect is available.

ITO powder having a function of totally cutting off more than 90% of infrared rays on the longer wavelength side from a wavelength of under 1,000 nm should preferably be employed. By using such an ITO powder as this, there is only a slight decrease in infrared-ray cutoff effect in combination with a binder or a polymer, and it is possible to cut off infrared rays within a wide wavelength range from a low wavelength near the visible region of the near-infrared region.

Such an infrared-ray cutoff effect is intrinsic to ITO, and an infrared-ray cutoff effect on a particular level is unavailable in any other inorganic oxide semiconductors such as antimony-doped tin oxide (hereinafter abbreviated as "ATO"), and aluminium-doped zinc oxide (AZO).

The present inventors further carried out extensive studies with a view to improving infrared-ray cutoff effects provided by ITO powder.

ITO powder is usually manufactured by causing an aqueous solution containing water-soluble salts of indium and a slight amount of tin to react with alkali to coprecipitate hydroxides of indium and tin, and heating and calcining the coprecipitate in the open air to convert it into oxides.

Figure 1:
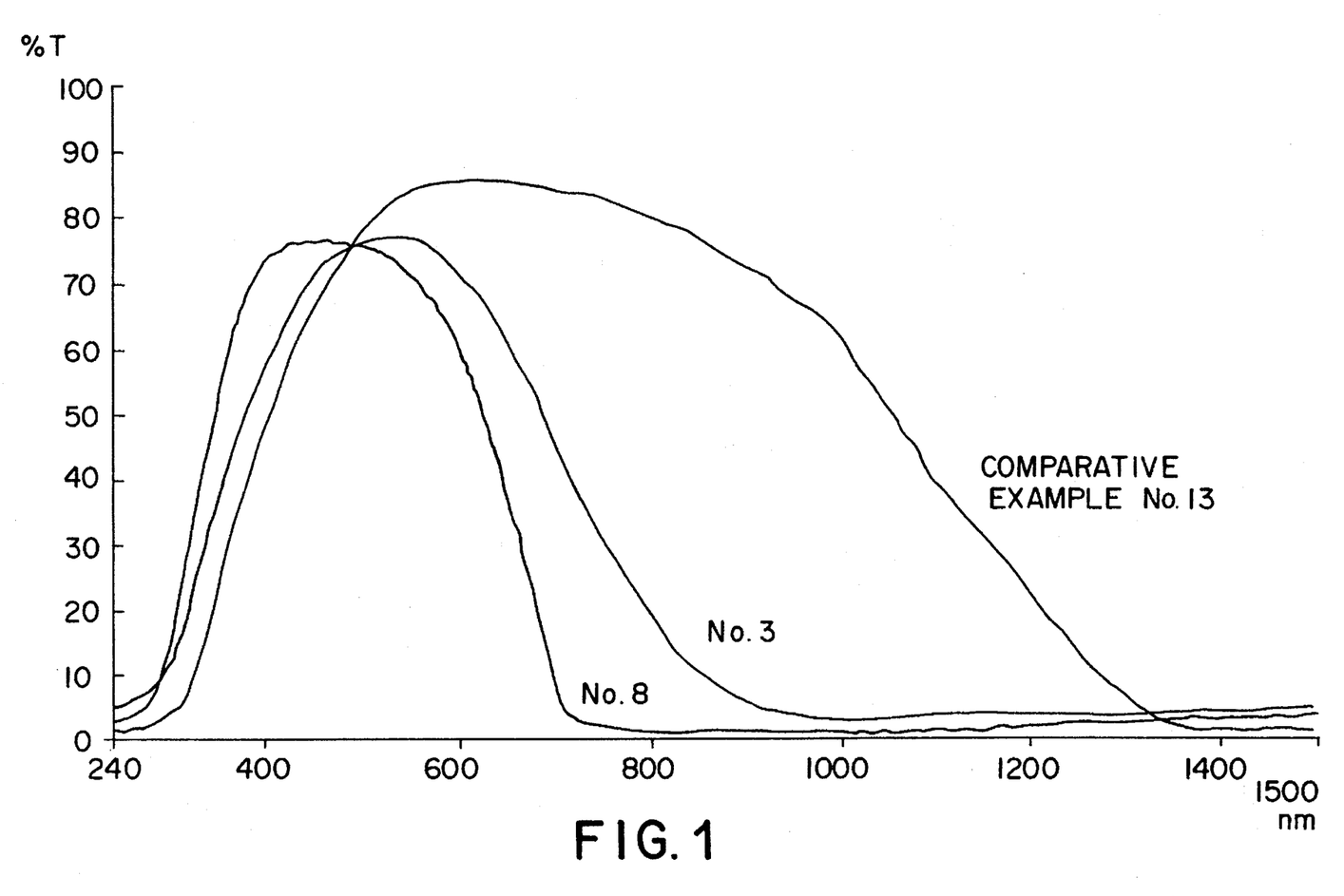
FIG. 1 is a light transmission spectrum of ITO powder obtained in Example 1.

Spectral characteristics of ITO powder manufactured by the conventional method as described above are such that, as shown in Comparative Example No. 13 in FIG. 1, the powder is excellent in light transmissivity within the visible region with a satisfactory transparency, but in terms of infrared-ray cutoff effect, it can cutoff only infrared rays within a wavelength range of over 1,000 nm, and at least 1,200 nm in most cases, and the cutoff effect of infrared rays in the region of up to 1,200 nm, particularly of up to 1,000 nm is lacking or insufficient. Therefore, when such ITO powder is dispersed in a resin matrix, infrared rays in the wavelength region near the visible region cannot be cut off. Since, even in this case, infrared rays of wavelengths longer than 1,800 nm can be cut off, the powder is useful for such uses as ink for preventing money-substituting papers and cash cards from being forged, and ink for hidden bar codes.

Further studies were conducted to impart an infrared-ray cutoff function at below 1,000 nm to ITO powder, and the results gave the following findings. By incinerating a material for ITO powder in an inert gas under pressure, or subjecting ITO powder obtained from calcination in the open air to a heat treatment in an inert gas under pressure, it is possible to obtain ITO powder cutting off more than 90% of infrared rays on the longer wavelength side from a wavelength of under 1,000 nm, or more preferably, from a wavelength within a range of from 700 to 900 nm. An investigation of this ITO powder revealed that the powder color tone on the xy chromaticity scale is represented by an x-value of from 0.220 to 0.295 and a y-value of from 0.235 to 0.325, and the crystal lattice constant is within a range of from 10.110 to 10.160 Å. ITO powder of such a color tone is novel. More preferably, the x-value is from 0.220 to 0.290 and the y-value is from 0.235 to 0.320, and the crystal lattice constant is from 10.110 to 10.130 Å.

The term "lattice constant" is a crystallographic constant defining the size and shape of the minimum unit of repetition of the atomic arrangement characterizing a crystal, and herein means the length (Å) of a side. The minimum cutoff wavelength means the minimum wavelength at which the light cutoff ratio becomes at least 90% within or near (at least 600 nm) the infrared region. This corresponds to the minimum wavelength in a wavelength region, in a light transmission spectrum, within which the light transmissivity becomes up to 10% in the direction of the longer wavelength side. More preferably, the minimum cutoff wavelength for the ITO powder of the present invention should be within a range of from 700 to 900 nm, but may be within a range slightly deviating toward the longer wavelength side (conditioning 900 to 1,000 nm) or toward the shorter wavelength side (600 to 700 nm)

When this ITO powder has an average primary particle size of up to 0.2 µm, forming a coating by preparing a coating material from this powder provides an infrared-ray cutoff coating excellent in transparency of visible light. The average particle size of the ITO powder of the present invention should therefore preferably be up to 0.2 µm, or more preferably, up to 0.1 µm. However, when applied for a use not requiring a very high transparency (an infrared-ray cutoff coating for a roof material or a wall material, for example), the particle size of ITO powder may be larger than this.

The tin content ratio Sn/(Sn+In) in a molar ratio of the ITO powder of the present invention should be from 0.01 to 0.15, or more preferably, within a range of from 0.04 to 0.12.

In terms of the x and y-values and the lattice constant, the infrared-ray cutoff effect of the ITO powder of the present invention is better when both the x and y-values are smaller within the above-mentioned ranges, and, particularly, a larger y-value leads to a sharp decrease in the effect. Even when the ranges of xy chromaticity values satisfy the above-mentioned requirements, if the value of the lattice constant is outside the range of 10.110 to 10.160 Å, there is available only an infrared-ray cutoff effect of wavelengths longer than 1,000 nm, which is almost the same as that achieved by the conventional ITO powder.

For the ITO powder, in general, the x and y-values are dependent mainly upon occurrence of oxygen vacancy and the concentration of carrier electrons, and the lattice constant, chiefly upon the dopant content and crystal strain caused by oxygen vacancy or the like. These values can therefore be adjusted by changing the manufacturing conditions.

The ITO powder of the present invention can be manufactured, for example, by a method comprising the step of calcination or heat treatment in a pressurized inert gas atmosphere as described below. The manufacturing method of ITO powder is not limited to that described below, but an ITO powder manufactured by any arbitrary method can be used in the present invention as long as it has x and y chromaticity values and a lattice constant within the above-mentioned ranges.

The raw material for the ITO powder may be prepared in the same manner as in the conventional method. For example, an aqueous solution prepared by dissolving water-soluble compounds of indium and tin (such as chlorides and nitrates) in water at an Sn/(Sn+In) molar ratio of 0.01 to 0.15, or more preferably, 0.02 to 0.12 is caused to react with an alkaline aqueous solution (such as an aqueous solution of a hydroxide, carbonate or hydrogencarbonate of an alkali metal or ammonium) to hydrolyze the individual water-soluble compounds and precipitate indium-tin coprecipitation oxides At this point, it is desirable to cause the reactions while dripping one aqueous solution into the other aqueous solution with stirring so as to achieve the finest possible precipitate.

The water-containing mixed hydroxides of indium-tin coprecipitate produced in this manner, or anhydrous mixed hydroxides prepared by heating-drying the above hydroxides to remove water, or mixed (hydro) oxides at least partially oxidized by further removing water are employed as the raw material. It suffices to heat the mixture to a temperature of up to 200° C., particularly up to, if drying is the only purpose, but if the purpose is to oxidize the mixture into oxides, it can be heated at a higher temperature (200° to 900° C., for example). By calcining the thus obtained raw material in a pressurized inert gas atmosphere insulated from oxygen until the mixture totally becomes oxides, an ITO powder having the above-mentioned color tone and lattice constant is available. Alternatively, this ITO powder is also available by calcining the raw material in the open air, for example, as in the conventional practice to produce an ITO powder, and then by heat-treating the resultant powder in a pressurized inert gas atmosphere.

The inert gas atmosphere for the calcination or the heat treatment (hereinafter referred to as a "heating treatment") may comprise any of argon, helium and other rare gases, nitrogen gas, and mixtures of these gases. The pressure of the inert gas atmosphere should preferably be at least 2 kgf/cm², or more preferably, within a range of from 5 to 60 kgf/cm² as the total pressure at room temperature.

With a pressure of under 2 kgf/cm², the infrared-ray cutoff effect is on almost the same level as in the conventional ITO powder with almost no improvement. In the case of heat treatment at a high temperature of over 800° C., however, an ITO powder having xy chromaticity and a lattice constant within the ranges of the present invention and an infrared-ray cutoff function of the present invention may sometimes be available even under atmospheric pressure of the inert gas atmosphere. Even under a pressure of over 60 kgf/cm². there is available only a limited improvement of the effect. It is not, therefore, necessary to apply a pressure in practice higher than this. The oxygen partial pressure in the inert gas atmosphere should preferably be limited to below 0.2 kgf/cm² (150 Torr), or more preferably, to below 0.02 kgf/cm² (15 Torr).

The heating treatment temperature should generally be within a range of from 350° to 1,000° C., or more preferably, within a range of from 400° to 800° C. At a treatment temperature of under 350° C., while the particle refining effect is high, there is available almost no improvement of the infrared-ray cutoff effect. At a temperature of over 1,000° C., on the other hand, the particle size grows too much to use the powder in an application requiring a high transparency of the coating. Any heating treatment time can be used as long as a uniform heating treatment of the raw material or the ITO powder is achieved. Depending upon the charged quantity and the temperature, the heating treatment time should usually be within a range of from 1 to 4 hours. There are no particular restrictions on heating and cooling rates.

Although an ITO powder obtained by the above-mentioned method is favorable for the infrared-ray cutoff material of the present invention, the ITO powder is not necessarily limited to this powder, and an ITO powder manufactured by the conventional method, a mixture of hydroxides and/or oxides of indium and tin, or an ITO powder commercially available as a conductive powder can be used.

[Infrared-ray cutoff material]

The infrared-ray cutoff material of the present invention comprises an ITO powder dispersed in an organic or inorganic matrix, in the form of either a film formed on a substrate, or a shape including a film or a sheet.

Infrared-ray cutoff coating

The infrared-ray cutoff coating is manufactured by applying a composition comprising one or more kinds of binder, an ITO powder and a solvent onto a substrate, and drying the coating.

There is no particular limitation on the type of substrate. The substrate can be transparent or opaque. The material can be any of plastics, glass, metals and ceramics. Because the infrared-ray cutoff coating of the present invention has a high transmissivity to visible light, it does not impair transparency of the substrate when applied to a transparent substrate such as a glass substrate. When applied to a substrate printed with a pattern or characters, for example, such a pattern or characters are never covered up.

Any organic solvent excellent in solubility of an organic resin binder, or any solvent which does not exert any adverse effect on the environment and comprising water and/or alcohol can be used. No particular restrictions are imposed on the binder forming the matrix, but it is desirable to use a binder capable of forming a coating excellent in transparency, and to select one or more kinds from among those soluble or dispersible in the solvent used.

When using an organic solvent, an organic resin commonly applied in a transparent paint can be used as a binder. Appropriate resins include acrylic, polycarbonate, polyvinyl chloride, urethane, melamine, alkyd, polyester, and epoxy resins, and one or more of these resins can be used in combination. Other resins are also applicable.

Applicable organic solvents with such an organic resin binder include aromatic hydrocarbons such as benzene, toluene and xylene; alicyclic hydrocarbons such as cyclohexane; aliphatic hydrocarbons such as hexane and octane; ethers, ketones and esters such as diacetone alcohol, diethylene glycol, butyl carbitol, isophorone, acetone, methylethyl ketone, methylisobutyl ketone, cyclohexanone, and ethyl acetate; hydrocarbon halides such as dichloromethane, and carbon tetrachloride; and an organic solvent containing two or more functional groups such as dimethyl formamide, butyl carbitol acetate, and diethanol amine. A mixed solvent comprising two or more kinds of organic solvent, or a mixed solvent comprising such solvent and alcohol can also be used.

When the solvent is water and/or alcohol, such favorable merits as a better operating environment and simplified facilities are provided. Applicable alcoholic solvents include monohydric alcohols such as methanol, ethanol, propanol, isopropanol, butanol, hexanol, and cyclohexanol, and polyhydric alcohols such as ethylene glycol.

In this case, a binder, that is soluble or dispersible in water and/or alcohol serving as a solvent, is used. Preferable binders include: (1) an alkoxide of silicon, aluminium, zirconium or titanium and/or a partial hydrolyzate thereof; (2) an organic resin soluble or dispersible in water and/or alcohol; and (3) a mixture thereof.

Examples of the alkoxide presented in (1) above include methoxide, ethoxide, propoxide, or butoxide of a metal selected from the group consisting of silicon, aluminium, zirconium and titanium or an isomer thereof (isopropoxide, sec-butoxide or t-butoxide, etc.), and one of more of them can be used. An alkoxide of any of these metals, when dissolved in water or alcohol and applied, is converted into an oxide through hydrolysis during drying, and forms an inorganic transparent coating comprising a metal oxide. These materials are therefore useful as a binder composing the inorganic matrix.

Examples of appropriate metal alkoxides include silicon tetraethoxide (ethyl silicate), aluminium triisopropoxide, zirconium tetrabutoxide, and titanium tetraisopropoxide. A partial hydrolyzate of a metal alkoxide prepared into a polymer by adding a slight amount of water and/or an acid to the metal alkoxide may also be used in place of the metal alkoxide or in mixture with the metal alkoxide.

As an organic resin soluble or dispersible in water and/or alcohol of (2) above, there are available organic resins used in water or alcohol paints. Among ones soluble or dispersible in water, a water-soluble or water-dispersible emulsion resin is employed. Examples of such a resin include water-soluble alkyd resin, polyvinyl alcohol and polybutyl alcohol, or emulsion-type water-dispersible resins such as acryl, acryl styrene and vinyl acetate. Among resins used with alcohols, an alcohol-soluble or alcohol-dispersible resin such as polyvinyl butyral or polyvinyl acetal may be used as a binder.

When the binder is a metal alkoxide, there is available a perfectly inorganic coating in which ITO powder is dispersed in a metal oxide matrix. This coating is particularly excellent in light transmissivity to visible light, hard, and high in heat resistance. When the binder is an organic resin (the solvent may be an organic solvent or water and/or alcohol), there is available a coating excellent in flexibility. It suffices, therefore, to select type of binder (hence the type of solvent) in response to the type and use of the substrate onto which a transparent coating having an infrared-ray cutoff function is to be formed.

When the substrate is a flexible plastic film, for example, flexibility can be ensured also for the transparent coating having an infrared-ray cutoff function by selecting an organic resin as the binder so as not to impair the flexibility of the substrate. When the substrate is made of glass and the coating must have a high hardness, on the other hand, it is desirable to use a metal alkoxide as the binder.

Furthermore, an organic resin and a metal alkoxide can be used in combination as the binder. It is thus possible to impart flexibility to the coating having an infrared-ray cutoff function and which is excellent in transparency when the binder is a metal alkoxide.

The blending ratios in a composition for application used for forming an infrared-ray cutoff coating include 1 to 2000 parts by weight, or preferably 10 to 400 parts by weight, or more preferably 20 to 200 parts by weight of binder relative to 100 parts by weight of ITO powder. The solvent can be in an amount which provides a viscosity suitable for the means of application used. It is usually within a range of from 5 to 5,000 parts by weight, or preferably, 10 to 500 parts by weight relative to 100 parts by weight of ITO powder.

A hardening agent, a cross-linking agent or the like can be blended in small quantities as required in this composition for application. Moreover, one or more kinds of additives commonly used in paint, such as a pH adjusting agent, an antifoaming agent and a wetting agent can also be added.

When the binder is a metal alkoxide, and the dispersion medium is an alcohol, an acid in an amount of up to 1 part by weight, or water in an amount of up to 20 parts by weight relative to 100 parts by weight of the metal alkoxide can be added to accelerate hydrolysis of the alkoxide as required.

The composition for as a coating or film application can be manufactured by mixing the above-mentioned constituents by means similar to that for the preparation of a paint. After applying this composition onto a substrate by an appropriate means such as immersion, brushing, printing or spraying, the applied composition is heated as required to remove the solvent and dried (hardened with cross-linking in some cases), and thus the infrared-ray cutoff coating of the present invention is formed. The drying temperature can be selected in accordance with the type of solvent or binder. No particular restrictions are imposed on the thickness of this infrared-ray cutoff coating. It should generally have a thickness within a range of from 0.1 to 10 µm, or more preferably, from 0.5 to 3 µm.

Infrared-ray cutoff shape

An infrared-ray cutoff shape is available by preparing a composition for forming through dispersion of an ITO powder in an organic polymer, and forming the resultant composition into a desired shape.

Any organic polymer capable of melt forming may be employed as the polymer serving as the matrix, and polymers so far utilized for the manufacture of a transparent forming film and the like are particularly preferable among these. Appropriate resins include acrylic, polycarbonate, polyester, polyvinyl chloride, polyvinylidene chloride, polypropylene, polystyrene, and ABS resins. The resin used is not limited to these general resins, but various functional resins including high-strength resins (engineering plastics), heat-resistant resins and weather-resistant resins can be used by selecting a resin in response to the desired use.

A resin having a particularly high transparency such as an acrylic resin or a methacrylic resin is used for a sun roof or a sun visor; a methacrylic resin, for optical fiber; a methacrylic resin, polycarbonate, polystyrene, diethylene glycol bis-allyl carbonate, or poly-4-methylpentene-1, for a lens for glasses.

The content ratio of the composition for forming should be, relative to 100 parts by weight of ITO powder, within a range of from 25 to 50,000 parts by weight of polymer, or preferably, from 25 to 5,000 parts by weight, or more preferably, from 50 to 2,000 parts by weight. Blending can be accomplished by a method capable of dispersing the powder into the molten or softened polymer. For example, any of the methods of kneading-mixing ITO powder into softened polymer with the use of a kneading roll, and the methods of mixing ITO powder into a molten polymer in an appropriate melting and mixing apparatus such as an extruding machine can be adopted. One or more kinds of known additives such as a dispersant, a coupling agent and a wetting agent can be blended also into this composition for forming. The composition can be pelletized after blending.

An infrared-ray cutoff shape is available by forming this composition. Applicable forming methods include extruding forming, press forming, injection molding, and inflating methods. A shape (a film, a sheet, a panel, a bar, a tube, a fiber and a three-dimensional shape, for example) having an infrared-ray cutoff function is thus obtained.

[Infrared-ray cutoff property]

All the infrared-ray cutoff materials (coating and shape) manufactured by the method as described above have a particle-dispersed structure in which ITO powder is uniformly dispersed in an organic or inorganic matrix. These infrared-ray cutoff materials show an infrared-ray cutoff property corresponding to the properties of the ITO powder used, if the other conditions including the type of matrix and the amount of blended ITO powder are identical. With the same amount of ITO powder, a larger ratio of ITO powder relative to the matrix leads to a higher infrared-ray cutoff effect.

When the ITO powder used has a minimum cutoff wavelength of under 1,000 nm, for example, the infrared-ray cutoff coating of the present invention generally presents properties as represented by a light transmissivity of over 80% relative to visible light, and an infrared ray cutoff capability of more than 90% of infrared rays ranging from a wavelength within a range of from 850 to 1,500 nm toward the longer wavelength side. If the ITO powder used has a minimum cutoff wavelength longer than 1,000 nm, the property of the infrared-ray cutoff coating is poorer than this: the wavelength at which infrared-ray cutoff of more than 90% begins becomes longer than 1,800 nm.

A light transmissivity to visible light (transparency) of higher than 80% can be maintained if the average primary particle size of ITO powder is smaller than 0.2 µm, particularly smaller than 0.1 µm, because uniform dispersion of primary particles into a medium almost fully inhibits scattering of light to visible light. It is thus possible to selectively cut off infrared rays without impairing transparency.

As the thickness increases as in a film or a sheet, transparency decreases, but the infrared-ray cutoff property does not largely change, and an infrared-ray cutoff property on substantially the same level as in a coating is available.

The infrared-ray cutoff material of the present invention can provide a very excellent infrared-ray cutoff property in that infrared rays with wavelengths within a near infrared region near the visible region can totally be cut off with high efficiency, and can present a high transparency, in spite of being able to be manufactured at a low cost with a capability of mass production. Furthermore, ITO powder was originally developed as a conductive powder, so that the infrared-ray cutoff coating of the present invention, for example, exhibits a high electric conductivity as represented by a surface resistance value within a range of from $10^2$ to $10^8$ $\Omega/\square$. The infrared-ray cutoff material of the present invention has, therefore, an antistatic function and a function of preventing dust deposition, simultaneously exhibiting the effect of making a coating applied to glass or a wall hard to become dirty.

An appropriate method of application of the infrared-ray cutoff material of the present invention can be selected in response to a particular use.

For a window glass, for example, the present invention is applicable by forming a transparent infrared-ray cutoff coating of the present invention on the glass by a spreading method, or sticking onto the window glass a transparent infrared-ray cutoff film of the present invention obtained by forming. By the presence of this transparent coating or film containing ITO powder, it is possible to reflect and cut off infrared rays in sun light over a wide range of wavelengths and thus to largely improve air-conditioning effect in a room.

In the case of a prepaid card, an infrared-ray cutoff coating is formed on a prescribed portion of the prepaid card by a spreading method. By irradiating infrared rays onto this prepaid card to check the presence of reflected light, it is possible to determine whether or not the card is a forgery.

For a sun roof, an optical fiber, a sun visor, a PET bottle, a coating for package, and glasses, as in the above-mentioned case of window glass, it is possible to impart an infrared-ray cutoff effect to the product material itself by forming a coating containing ITO powder onto the product substrate by the spreading method, or when the product is made of plastics, by forming the product while adding ITO powder to the material resin. When it is possible to adhere a film to, for example a sun roof, as in the case of the window glass, an infrared-ray cutoff property can be imparted to the product by adhering a transparent film containing ITO powder to the product.

The ITO powder-containing coating material, the forming material, or the ITO powder of the present invention is applicable for the other uses requiring infrared-ray cutoff in addition to those mentioned above. For example, by providing a transparent coating or film containing ITO powder on a glass of a storage warehouse or a plastic transparent wall surface, or by kneading ITO powder into the wall material, it is possible to prevent dew formation on the warehouse outer surface or a temperature increase in the warehouse. Even when the wall surface of the warehouse is opaque, provision of a coating or a film containing ITO powder prevents a temperature increase in the warehouse and the resultant deterioration of stored goods by cutting off infrared rays from the outside.

When applying the product of the present invention to a vinyl house or a hothouse, the effect of accelerating the growth of plants is available as a result of a heat insulating effect in the house. In this case also, it suffices to form a film containing ITO powder on the surface of the plastic film or the glass, or to add ITO powder to the plastic film itself. In the case of glass, the adhering of a film containing ITO powder is also possible.

A coating containing ITO powder can be formed on the surface of fibers by spreading or spraying a coating material containing ITO powder of the present invention onto a textile product such as clothes and bedclothes. In the case of a synthetic fiber, the fiber itself can be caused to contain ITO powder by spinning a yarn with the use of a forming material containing ITO powder of the present invention. Since far infrared rays irradiated from a human body are then reflected from fibers, there is available a higher heat insulating effect.

It is possible to apply a coating or a film containing ITO powder by the same technique as for a window glass also to a peep hole of a baking chamber, a microwave oven, a toaster or an oven. In this case, however, it is desirable to use, as the matrix, a heat resistant resin (for example, polyimide, polyamino-bismaleimide, polysulfone, polyethersulfone, polyamideimide, polyphenylenesulfide, polyetherimide, or polyetheretherketone).

In an electric heater using a glass heater, heat irradiated from the electric resistor is effectively reflected, thus improving a room heating effect, by providing a coating or a film containing ITO powder around a glass heater as in the case of the glass window. In this case also, it is desirable to use a heat resistant resin as the matrix.

It is also possible to mix the ITO powder of the present invention into cosmetics such as a foundation or a sun screen. This improves the near infrared-ray cutoff effect. Because the near infrared rays, particularly the wavelength region of from 2.5 to 3 μm is the water absorption region, an increased cutoff effect thereof is effective in preventing occurrence of deep wrinkles caused by the evaporation of water.

According to the present invention, it is possible to achieve a more effective exhibiting of the functions as described above than with the conventional infrared-ray cutoff materials or infrared-ray cutoff powder.

[EXAMPLES]

The present invention will now be described further in detail by means of examples and comparative examples, but the present invention is not limited to these examples. In the examples and comparative examples described below, the average primary particle size of powder was calculated from measured values of specific surface area (BET), in accordance with the following formula for the particle size:

$$a\ (\mu m) = 6/(\rho \times B)$$

where, a: average particle size

ρ: true specific gravity

B: specific surface area (m²/g).

It has already been confirmed that the particles size calculated from the specific surface area substantially agrees with that directly observed through a transmission electron microscope. The specific surface area based on the BET method was measured by means of a beta sorb automatic surface area meter Model 4200 manufactured by Leed & Northrap.

The light transmission spectrum and the xy chromaticity of powders, coatings and films were measured by a diffusion reflection method with the use of a self-recording spectrophotometer Model U-4000 with an integration sphere (manufactured by Hitachi Limited). The lattice constant was determined by computer calculation by the minimum square method, by means of an automatic X-ray diffraction device M03X with a monochrometer (manufactured by Mac Science), by correcting the results in terms of high-purity silicon single crystal (99.9999%) and automatically retrieving the face interval from peaks for (k, h, l) face indices.

EXAMPLE 1

Manufacture of ITO powder

A mixed aqueous solution comprising an aqueous solution of $InCl_3$ in an amount of 1.8 l (containing 600 g In metal) and an solution of 60% $SnCl_4$ in an amount of 22.92 g (containing 6.27 g Sn metal) was dripped while stirring with heating to 70° C. into an aqueous solution of $NH_4HCO_3$ in an amount of 3,000 g/12 l, and In-Sn coprecipitation hydroxides were precipitated with a final pH of 8.5. Then, after holding the solution to cause sedimentation of the precipitate, the supernatant liquid was removed, and the precipitate was sufficiently water-rinsed by repeating six times a cycle comprising holding, sedimentation and removal of supernatant liquid after adding ion-exchange water (the quantity of added water was 10 l per cycle). Then, the precipitate was separated through filtration by means of suction, and a precipitate of hydrous hydroxides was thus obtained. The thus obtained coprecipitate of hydrous hydroxides with an Sn content in the total metal of 1 mol % is herein called the "hydrous raw material (A)."

In the same manner, the quantity of 60% $SnCl_4$ aqueous solution was increased to (B) 58.1 g, (C) 119.2 g, (D) 183.9 g, (E) 252 g, (F) 323 g, and then (G) 453.5 g, and hydrous raw materials (B) to (G) were obtained, which respectively had Sn contents in mol % of 2.5%, 5%, 7.5%, 10%, 12.5%, and 15%.

Starting raw materials were prepared from these raw materials (A) to (G) through, as required, drying or dehydrating by heating in the open air as shown in Table 1, and the thus prepared raw materials were subjected to heating treatment for three hours under the conditions shown in Table 2 in the open air or in a nitrogen gas atmosphere to obtain ITO powders.

TABLE 1

| Hydrous raw material | Tin mol % | Symbol | State of prepared raw material |
|---|---|---|---|
| (A) | 1 | A-1 | 110° C. × 15 hr, dried |
| (B) | 2.5 | B-1 | 110° C. × 15 hr, dried |
| (C) | 5 | C-1 | Hydrous hydroxide (not dried) |
| | | C-2 | 110° C. × 15 hr, dried |
| | | C-3 | 300° C. × 6 hr, dehydrated |
| | | C-4 | 700° C. × 6 hr, dehydrated |
| (D) | 7.5 | D-1 | 110° C. × 15 hr, dried |
| (E) | 10 | E-1 | 110° C. × 15 hr, dried |
| (F) | 12.5 | F-1 | 110° C. × 15 hr, dried |
| (G) | 15 | G-1 | 110° C. × 15 hr, dried |

TABLE 2

| | | Heat treatment condition | | | Characteristics | | | | | | |
|---|---|---|---|---|---|---|---|---|---|---|---|
| | | | | | Particle size | xy chromaticity | | Lattice constant | Cutoff ratio (%) | | |
| No. | Division | Atmosphere | Pressure (kgf/cm³) | Temp. (°C.) | (μm) | x-value | y-value | (Å) | 700 nm | 900 nm | 1000 nm |
| 1 | A-1 | $N_2$ | 40 | 750 | 0.088 | 0.2751 | 0.3195 | 10.1216 | 29 | 97 | 96 |
| 2 | B-1 | $N_2$ | 25 | 600 | 0.039 | 0.2511 | 0.3081 | 10.1186 | 41 | 95 | 94 |
| 3 | C-1 | $N_2$ | 40 | 550 | 0.031 | 0.2733 | 0.2993 | 10.1124 | 51 | 96 | 94 |
| 4 | D-1 | $N_2$ | 20 | 450 | 0.028 | 0.2611 | 0.3115 | 10.1272 | 69 | 98 | 95 |

TABLE 2-continued

| | | Heat treatment condition | | | Characteristics | | | | | | |
|---|---|---|---|---|---|---|---|---|---|---|---|
| | | | | | Particle | xy chromaticity | | Lattice | | | |
| | | Atmo- | Pressure | Temp. | size | x- | y- | constant | Cutoff ratio (%) | | |
| No. | Division | sphere | (kgf/cm³) | (°C.) | (μm) | value | value | (Å) | 700 nm | 900 nm | 1000 nm |
| 5 | D-2 | N₂ | 20 | 450 | 0.024 | 0.2701 | 0.2910 | 10.1210 | 67 | 98 | 96 |
| 6 | D-3 | N₂ | 25 | 550 | 0.041 | 0.2744 | 0.2915 | 10.1168 | 71 | 97 | 93 |
| 7 | D-4 | N₂ | 60 | 700 | 0.068 | 0.2691 | 0.2852 | 10.1465 | 69 | 97 | 98 |
| 8 | E-1 | N₂ | 30 | 500 | 0.027 | 0.2633 | 0.2781 | 10.1271 | 93 | 98 | 98 |
| 9 | E-2 | N₂ | Atm. pres. | 850 | 0.098 | 0.2215 | 0.3205 | 10.1300 | 72 | 98 | 93 |
| 10 | F-1 | N₂ | 45 | 450 | 0.022 | 0.2911 | 0.2483 | 10.1311 | 81 | 95 | 96 |
| 11 | G-1 | N₂ | 20 | 500 | 0.019 | 0.2788 | 0.2720 | 10.1373 | 67 | 94 | 94 |
| 12 | E-1 | N₂ | Atm. pres. | 500 | 0.035 | 0.2705 | 0.3110 | 10.1033 | — | — | 47 |
| 13 | F-1 | Open air | Atm. pres. | 800 | 0.048 | 0.3635 | 0.3861 | 10.1060 | — | — | 38 |
| 14 | F-2 | N₂ | Atm. pres. | 550 | 0.016 | 0.3637 | 0.3900 | 10.1248 | — | — | 31 |
| 15 | F-3 | Open air | 60 | 350 | 0.010 | 0.2851 | 0.3730 | 10.1158 | — | — | 44 |
| 16 | A-1 | Open air | Atm. pres. | 350 | 0.008 | 0.3645 | 0.3933 | 10.0981 | — | — | 30 |
| 17 | A-1 | N₂ | 2 | 450 | 0.050 | 0.2711 | 0.3188 | 10.1088 | — | — | 51 |

Heating of the hydrous raw materials and the prepared raw materials in the open air and heating thereof in the nitrogen gas under atmospheric pressure were carried out by putting raw material in an amount of 250 g in a half-cut quartz boat having a length of 250 mm, with the use of a tubular furnace using a transparent quartz tube having an inside diameter of 85 mm and a length of 1,000 mm.

Heating in a pressurized nitrogen atmosphere comprised using a sealed pressurized tubular furnace using a tube made of Incolloy 800 having an inside diameter of 70 mm and a length of 700 mm, charging 150 g raw material put in a 250 mm-long half-cut quartz boat into the tubular furnace, then evacuating the furnace to a vacuum, then pressurizing the interior of the furnace with nitrogen gas to a prescribed pressure, increasing the temperature to a prescribed level in the sealed state and holding this temperature for three hours.

Characteristic data of ITO powders obtained in the tests mentioned above are shown in Table 2, and typical examples of light transmission spectra of ITO powders are shown in FIG. 1.

As is clear from the results of measurement shown in Table 2, all the ITO powders Nos. 1 to 11 satisfying the conditions including an x-value of from 0.220 to 0.295 and a y-value of from 0.235 to 0.325 on the xy chromaticity scale and a lattice constant of from 10.110 to 10.160 are excellent in infrared-ray cutoff function showing an infrared-ray cutoff ratio of over 90% for 900 nm in all cases. The values of minimum cutoff wavelength of ITO powders in these Examples are within a range of from 700 to 900 nm except for No. 8, and ITO powder No. 8 showed a minimum cutoff wavelength of 695 nm.

In Nos. 12 to 17, in which at least one of the x and y-values and lattice constant was outside the above-mentioned ranges, the infrared-ray cutoff ratio at 1,000 nm was about 50% or under, and in the region of under 1,000 nm, the infrared-ray cutoff effect was very poor. However, even such ITO powders may be applicable in the present invention for some uses because of the infrared-ray cutoff effect that exists in the region on the longer wavelength side.

As is evident from the light transmission spectrum shown in FIG. 1, Nos. 3 and 8 ITO powders, of which the color tone (x and y-values) and the lattice constant satisfy the above-mentioned conditions are more excellent in the infrared-ray cutoff effect as compared with No. 13 ITO powder outside the scope of the above-mentioned conditions.

EXAMPLE 2

Manufacture of ITO powder

The hydrous raw material A in Example 1 was dried overnight at 110° C., and calcined by heating at 600° C. for three hours in a pressurized nitrogen gas atmosphere under a pressure of 15 kgf/cm² in the same manner as in the Example 1, to obtain an ITO powder. The ITO powder showed, on the xy chromaticity scale, an x-value of 0.2515 and a y-value of 0.3083, a lattice constant of 10.1180 and an average primary particle size of 0.032 μm. This ITO powder exhibited an excellent infrared-ray cutoff of more than 94% of infrared rays in the wavelength range of over 750 nm in the light transmission spectrum, with a minimum cutoff wavelength of 700 nm.

Comparative Example 1

Manufacture of ATO powder

An antimony-doped tin oxide (ATO) powder was prepared as an example of a conductive powder other than ITO.

A mixed aqueous solution comprising 1.8 l aqueous SnCl₄ solution (containing 600 g Sn metal) and 0.2 l aqueous SbCl₃ solution (containing 80 g Sb metal) was dripped, while stirring with heating to 90° C., into an aqueous solution of 900 g/12 l NaOH, and Sn-Sb coprecipitation hydroxides were precipitated with a final pH of 7. The precipitate was rinsed and filtered in the same manner as in Example 1 to obtain a precipitate of hydrous coprecipitation hydroxides. This precipitate was dried overnight at 110° C., and then calcined in a pressurized nitrogen gas atmosphere in the same manner as in Example 2, to obtain an ATO powder.

The ATO powder had an x-value of 0.2812 and a y-value of 0.3083 on the xy chromaticity scale, a lattice constant as represented by $a_o$: 4.7370 and $c_o$: 3.1849, and an average primary particle size of 0.029 μm. The light transmission spectrum of this powder suggests that more than 33% of infrared rays are cut off at 1,200 nm and more than 96% of rays are totally cut off finally in a wavelength range of over 1,240 nm. The powder showed a minimum cutoff wavelength of 1,240 nm.

Now, the following Examples present examples of manufacture of infrared-ray cutoff materials using the ITO powder and the ATO powder obtained in Example 2 and Comparative Example 1, respectively.

EXAMPLE 3

A composition for as a coating application was prepared by putting 8 g ITO powder, 5 g acrylic resin solution (a solid resin of 42.1% and a mixed solvent of xylene/methylethyl ketone), 12 g xylene, and 20 g glass beads into a 100-cc glass bottle, dispersing and kneading the mixture for five hours while confirming the status of dispersion by means of a granularity gauge using a paint shaker, and then removing the glass beads. This composition for application was applied over a PET film with a bar coater, and dried at 100° C., to form an ITO powder-containing coating having a thickness of 3 μm.

EXAMPLE 4

A 1 μm-thick coating containing ITO powder was formed on a PET film in the same manner as in Example 3, except that the amount of acrylic resin solution was changed to 10 g.

EXAMPLE 5

ITO powder in an amount of 8 g, 4 g polycarbonate resin, 12 g tetrahydrofuran, 5 g dimethylformamide, and 20 g glass beads were put in a 100-cc glass bottle, and the mixture was dispersed and kneaded for 6.5 hours while confirming the status of dispersion by means of a granularity gauge using a paint shaker. Then, a composition for application obtained by removing the glass beads was applied onto a PET film with a bar coater, and dried at 100° C. to form a 2 μm-thick coating containing ITO powder.

Comparative Example 2

A 2 μm-thick ATO coating containing ATO powder was formed on a PET film in the same manner as in Example 3 except that an ATO powder was used in place of the ITO powder.

EXAMPLE 6

ITO powder in an amount of 10 g was sufficiently kneaded, together with zinc stearate (dispersant) in a slight amount, into 200 g polyvinyl chloride resin softened in a 120° C. heat roll. Then, the resultant mixture was sandwiched between two 0.3 mm-thick stainless steel sheets by means of a 0.1-mm spacer, and after pressing it at 120° C. for five minutes, the pressed mixture was cooled to obtain a film containing ITO powder having a thickness of from 70 to 100 μm.

Figure 2:
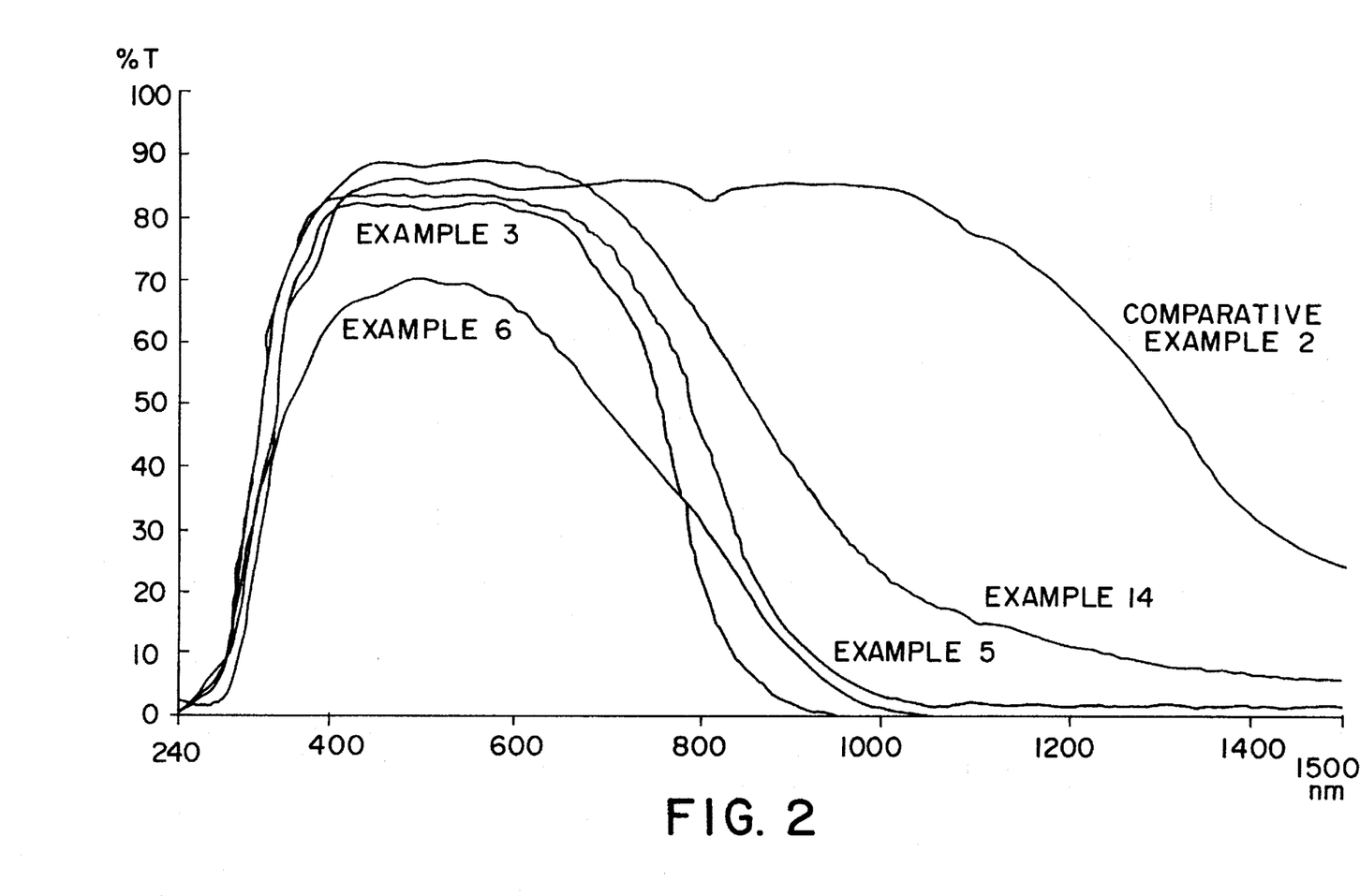
FIG. 2 is a light transmission spectrum of coatings or films obtained in Examples 3 to 6 and Comparative Example 2.

Light transmission spectra for the coatings or films obtained in Examples 3 to 6 and Comparative Example 2 are comprehensively shown in FIG. 2. As is clear from FIG. 2, all the coatings containing ITO powder obtained in Examples 3 to 5 show an excellent light transmissivity of more than 80% in the visible region and have an excellent infrared-ray cutoff function in that more than 80% of infrared rays on the longer wavelength side from a wavelength within a range of from 800 to 1,100 nm can be cut off in the infrared region. Comparison of Examples 3 and 4 demonstrates that a larger amount of ITO powder permits cutoff of infrared rays ranging from a shorter wavelength, and thus leads to a higher cutoff effect.

As a film containing ITO has a larger thickness as in the Example 6, although the transmissivity (transparency) in the visible region decreases, the infrared-ray cutoff effect shows no marked difference from that in a thinner coating, thus ensuring an excellent infrared-ray cutoff effect.

In the coating containing ATO of Comparative Example 2, the infrared-ray cutoff ratio is only slightly higher than 30% even at 1,200 nm, revealing a very poor infrared-ray cutoff effect. The infrared-ray cutoff ratio exceeds 80% only for wavelengths longer than 1,690 nm.

EXAMPLE 7

ITO powder in an amount of 10 g was dispersed for 60 minutes in 20 g ethyl alcohol by means of a paint shaker (25 g glass beads). To this powder dispersion liquid, 10 g ethyl silicate as a binder, 0.4 g 1N hydrochloric acid for accelerating hydrolysis of alkoxide, and 2 g pure water were added. The mixture was further shaken for 150 minutes, and the beads were removed to prepare a composition for application.

This composition was then applied onto a PET film by means of a bar coater, and dried at 100° C., to form a 1 μm-thick coating containing ITO powder.

EXAMPLE 8

A coating containing ITO powder was formed from 10 g ITO powder, using 90 g isopropyl alcohol, and as a binder, 10 g ethyl silicate and 3.5 titanium tetrapropoxide in the same manner as in Example 7.

EXAMPLE 9

By the use of a paint shaker (25 g glass beads), 10 ITO powder were dispersed for 120 minutes in 10 g pure water. Then, 7 g water-soluble alkyd resin (solid content: 50%) as a binder, and 0.3 g cobalt naphthenate as a hardening agent were added to this powder dispersion liquid, and the mixture was further shaken for 150 minutes. A composition for application was thus prepared by removing the beads. With the use of this composition, a transparent coating containing ITO powder was formed in the same manner as in Example 7.

EXAMPLE 10

By the use of a paint shaker (25 g glass beads), 10 g ITO powder were dispersed for 120 minutes in 10 g pure water. Then, 5 g of an emulsion-type acrylic resin (solid content: 40%) were added as a binder to this powder dispersion liquid, and the mixture was further shaken for 90 minutes. A composition for application was thus prepared after removing the beads. With the use of this composition, a transparent coating containing ITO powder was formed in the same manner as in Example 7.

EXAMPLE 11

By the use of a paint shaker (25 g glass beads), 10 g ITO powder were dispersed for 60 minutes in 20 g ethyl alcohol. Then, 10 g ethyl silicate and 0.5 g polybutyl alcohol resin dissolved in 10 g ethyl alcohol were added as binders to this powder dispersion liquid, and the mixture was further shaken for 90 minutes. A composition for application was thus prepared after removing the beads. With the use of this composition, a transparent coating containing ITO powder was thus formed in the same manner as in Example 7.

Comparative Example 3

A transparent coating containing ATO powder was formed in the same manner as in Example 7, except that ATO powder was employed in place of ITO powder.

Figure 3:
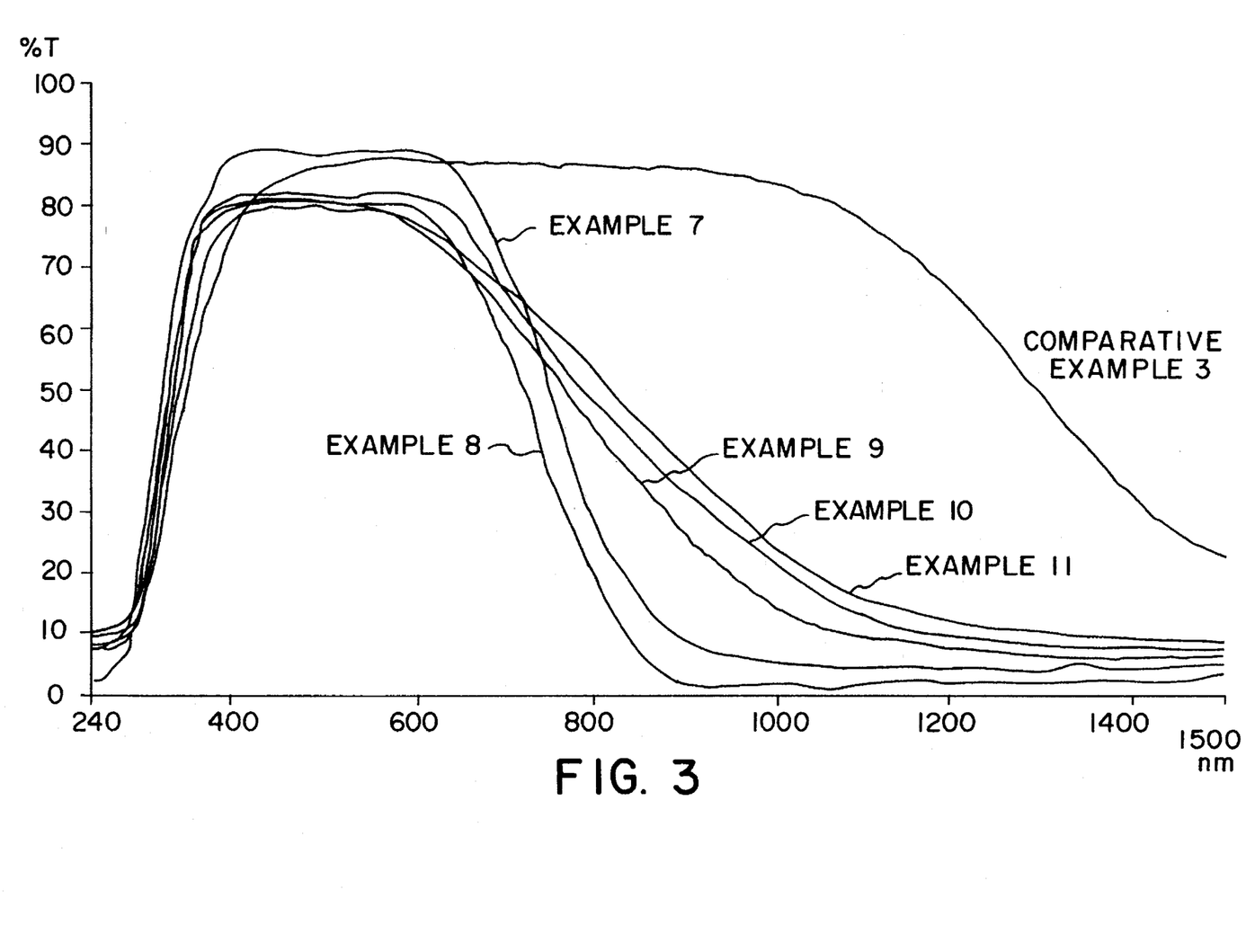
FIG. 3 is a light transmission spectrum of coatings obtained in Examples 7 to 11 and Comparative Example 3.

Light transmission spectra of coatings obtained in the above-mentioned Examples 7 to 11 and Comparative Example 3 are comprehensively shown in FIG. 3. All the coatings containing ITO powder obtained in Examples 7 to 11 show an excellent light transmissivity of about or even over 80% in the visible region and have an excellent infrared-ray cutoff function in that more than 80% of infrared rays on the longer wavelength side from a wavelength within a range of from 800 to 1,100 nm can be cut off in the infrared region. As in Examples 7 and 8, a perfectly inorganic coating having a matrix formed of a metal alkoxide demonstrates a very excellent cutoff effect in that it has a higher infrared-ray cutoff effect, permits cutoff of infrared rays ranging from a lower wavelength, and enables more than 80% of infrared rays to be totally cut off from portions near the visible region.

In the coating containing ATO of Comparative Example 3, in contrast, the infrared-ray cutoff ratio is only slightly over 30% even at 1,200 nm, suggesting a very poor infrared-ray cutoff effect. In this case, the infrared-ray cutoff ratio exceeds 80% only at a wavelength of over 1,630 nm.

Some preferred embodiments of the present invention have been described above. Various modifications can be made within the scope of the present invention, and a person skilled in the art will understand that such modifications are within the scope of the present invention.

What is claimed is:

1. An infrared-ray cutoff material which comprises a tin-doped indium oxide powder dispersed in an organic or inorganic matrix, said powder having a color tone on the xy chromaticity scale represented by an x-value of from 0.220 to 0.295 and a y-value of from 0.235 to 0.325, and said powder having a crystal lattice constant within a range of from 10.110 to 10.160 Å.

2. An infrared-ray cutoff material as claimed in claim 1, wherein said matrix is transparent.

3. An infrared-ray cutoff material as claimed in claim 1, wherein; said material is in the form of a coating formed on a substrate.

4. An infrared-ray cutoff material as claimed in claim 3, wherein: said substrate is made of glass or plastics.

5. An infrared-ray cutoff material as claimed in claim 3, wherein the material of said matrix is selected from the group consisting of transparent organic resins, and inorganic metal oxides made by hydrolysis and calcination of a metal alkoxide.

6. An infrared-ray cutoff material as claimed in claim 1, wherein said material is in a form selected from the group consisting of a film, a sheet, a fiber, a panel, a bar, a tube and three-dimensional shapes.

7. An infrared-ray cutoff material as claimed in claim 6, wherein: said matrix is an organic polymer.

8. An infrared-ray cutoff material as claimed in claim 6, wherein said material is in the form of a film which is adhered to the surface of a substrate.

9. An infrared-ray cutoff material as claimed in claim 1, wherein said tin-doped indium oxide powder can totally cut off more than 90% of infrared rays on the longer wavelength side from a wavelength of about 700 nm.

10. An infrared-ray cutoff material as claimed in claim 1, wherein said tin-doped indium oxide powder has an average primary particle size of up to 0.2 μm.

11. An infrared-ray cutoff material as claimed in claim 10, wherein said tin-doped indium oxide powder has an average primary particle size of up to 0.1 μm.

12. A method of manufacturing an infrared-ray cutoff material as claimed in claim 3, which comprises the steps of: applying a composition comprising one or more kinds of binder, a tin-doped indium oxide powder, and a solvent onto a substrate, and drying the thus applied coating.

13. A method as claimed in claim 12, wherein said solvent is an organic solvent, and said binder is an organic resin.

14. A method as claimed in claim 12, wherein said solvent is selected from the group consisting of water and alcohol, and said binder is selected from the group consisting of (a) alkoxides of silicon, aluminium, zirconium and titanium and partial hydrolyzates thereof, and (b) organic resins soluble in, or dispersible in, said solvent.

15. A method as claimed in claim 12, wherein said composition contains, relative to 100 parts by weight of ITO powder, 1 to 2,000 parts by weight of said binder and 5 to 5,000 parts by weight of said solvent.

16. A method of manufacturing the infrared-ray cutoff material as claimed in claim 6, wherein a composition comprising said organic polymer and ITO powder dispersed therein is formed into a desired shape.

17. A method as claimed in claim 16, wherein said composition contains, relative to 100 parts by weight of ITO powder, 25 to 50,000 parts by weight of said polymer.

18. A tin-doped indium oxide powder having an infrared-ray cutoff function, which has a color tone as represented on the xy chromaticity scale of an x-value within a range of from 0.220 to 0.295 and a y-value within a range of from 0.235 to 0.325, a lattice constant within a range of from 10.110 to 10.160 Å, and a minimum cutoff wavelength of up to 1,000 nm in or near the infrared region.

19. A tin-doped indium oxide powder as claimed in claim 18, wherein said powder has an average primary particle size of up to 0.2 μm.

20. A tin-doped indium oxide powder as claimed in claim 19, wherein said powder has an average primary particle size of up to 0.1 μm.

* * * * *